United States Patent
Mo et al.

(10) Patent No.: US 9,739,936 B2
(45) Date of Patent: Aug. 22, 2017

(54) LOW-LOSS FEW-MODE FIBER

(71) Applicants: WUHAN RESEARCH INSTITUTE OF POSTS AND TELECOMMINICATIONS, Wuhan, Hubei Province (CN); FIBERHOME TELECOMMUNICATION TECHNOLOGIES CO., LTD., Wuhan, Hubei Province (CN)

(72) Inventors: Qi Mo, Wuhan (CN); Huang Yu, Wuhan (CN); Wen Chen, Wuhan (CN); Cheng Du, Wuhan (CN); Zhiqiang Yu, Wuhan (CN); Dongxiang Wang, Wuhan (CN); Bingfeng Cai, Wuhan (CN)

(73) Assignees: WUHAN RESEARCH INSTITUTE OF POSTS AND TELECOMMUNICATIONS, Wuhan, Hubei Province (CN); FIBERHOME TELECOMMUNICATION TECHNOLOGIES CO., LTD., Wuhan, Hubei Province (CN)

(*) Notice: Subject to any disclaimer, the term of this patent is extended or adjusted under 35 U.S.C. 154(b) by 0 days.

(21) Appl. No.: 15/317,102

(22) PCT Filed: Nov. 3, 2015

(86) PCT No.: PCT/CN2015/093674
§ 371 (c)(1),
(2) Date: Dec. 7, 2016

(87) PCT Pub. No.: WO2016/173232
PCT Pub. Date: Mar. 11, 2016

(65) Prior Publication Data
US 2017/0115450 A1    Apr. 27, 2017

(30) Foreign Application Priority Data

Apr. 29, 2015 (CN) .......................... 2015 1 0217081

(51) Int. Cl.
*G02B 6/036* (2006.01)
*G02B 6/028* (2006.01)

(52) U.S. Cl.
CPC ....... *G02B 6/03666* (2013.01); *G02B 6/0288* (2013.01)

(58) Field of Classification Search
CPC .......................... G02B 6/03666; G02B 6/0288
See application file for complete search history.

(56) References Cited

U.S. PATENT DOCUMENTS

| | | | |
|---|---|---|---|
| 2013/0071114 A1* | 3/2013 | Bickham | G02B 6/0288 398/44 |
| 2013/0230290 A1* | 9/2013 | Evans | G02B 6/0288 385/124 |

(Continued)

*Primary Examiner* — Sung Pak
(74) *Attorney, Agent, or Firm* — Kile Park Reed & Houtteman LLC

(57) ABSTRACT

A low-loss few-mode fiber relates to the technical field of optical communications and related sensing devices, and includes, from inside to outside, a core layer (1), a fluorine-doped quartz inner cladding (2), a fluorine-doped quartz second core layer (3), a fluorine-doped quartz depressed cladding (4) and a fluorine-doped quartz outer cladding (5); germanium element is not doped within the core layer (1), the refractive index of the core layer (1) is in gradient distribution, and the distribution is a power-exponent distribution; the maximum value of difference in relative refractive index between the core layer (1) and the fluorine-doped quartz inner cladding (2) is 0.3% to 0.9%; the relative refractive index difference of the fluorine-doped quartz inner cladding (2) with respect to synthetic quartz is −0.3% to −0.5%; the difference in relative refractive index between the fluorine-doped quartz second core layer (3) and the (Continued)

fluorine-doped quartz inner cladding (2) is 0.05% to 0.2%; the difference in relative refractive index between the fluorine-doped quartz depressed cladding (4) and the fluorine-doped quartz inner cladding (2) is −0.1% to −0.5%; the relative refractive index difference of the fluorine-doped quartz outer cladding (5) with respect to synthetic quartz is −0.3% to −0.5%. The transmission loss of optical signals of the linear polarization modes that are supported by the few-mode fiber and the relay cost are reduced.

18 Claims, 2 Drawing Sheets

(56) References Cited

U.S. PATENT DOCUMENTS

| | | | |
|---|---|---|---|
| 2015/0077837 A1* | 3/2015 | Abedin | H01S 3/06716 359/341.5 |
| 2016/0091660 A1* | 3/2016 | Li | G02B 6/02019 398/143 |
| 2016/0223743 A1* | 8/2016 | Sillard | G02B 6/0288 |
| 2016/0231503 A1* | 8/2016 | Sillard | G02B 6/0288 |
| 2016/0274300 A1* | 9/2016 | Li | G02B 6/0288 |

\* cited by examiner

LOW-LOSS FEW-MODE FIBER

TECHNICAL FIELD

The present invention relates to the technical field of optical communications and related sensing devices, and more particularly to a low-loss few-mode fiber.

BACKGROUND ART

The data communications over fiber-optic networks continue to grow exponentially. In order to meet this need, multiplexing technology has been developed to allow multiple scattered data flows to share the same fibers, thus greatly increasing the traffic of each fiber.

In the optical fiber industry, the current research and development focus mainly on DWDM (Dense Wavelength Division Multiplexing). DWDM is one of multiplexing technology in which multiple data channels are assigned to respective wavelengths within a certain operating bandwidth. Data channels are combined with the basic mode (LP01) of single-mode fibers for transmission, and when arriving at their respective destinations, they are returned to separation channels respectively.

In a DWDM-based transmission system, the total capacity within a given amplifier bandwidth is limited by spectral efficiency, and the spectral efficiency is used to describe, at a given data rate, the degree of closeness to which a single wavelength can be spaced for communication purposes when the fibers are subjected to the extreme limitation due to non-linear effects. Although the use of increasingly complex algorithms can improve the spectral efficiency, the decrease in bandwidth gains is brought and the modest improvement can not meet the exponentially-growing bandwidth needs, and the spectral efficiency of DWDM in single-mode fibers will approach its theoretical limits. A promising way to increase the capacity of each fiber is mode-division multiplexing, in which the corresponding multiple optical signal modes guided by fibers are provided. Based on this technology, it can be expected to have the potential to significantly increase the transmission capacity of each fiber, and to break through the limitation of nonlinearity of the DWDM-based system.

At present, the few-mode fiber technology around the world is mainly concerned with the optimization of group delay of fibers, for example, Chinese Patent CN201280019895.2, in which a design of graded-index few-mode fiber for spatial multiplexing is disclosed. However, the above technical solutions are all based on the germanium-doped core region for adjusting the distribution of refractive index of the fiber core region. As germanium-doped quartz has a higher scattering coefficient, a high fiber loss is generated. Moreover, in an application of ultra-long-distance high-capacity optical fiber communications, the attenuation coefficient of germanium-doped graded-index few-mode fibers at 1550 nm is generally above 0.19 dB, and the attenuation coefficient also varies with the change of ambient temperature conditions, resulting in excessive loss which in turn leads to the increase of error codes in the communication system and the increase of relay costs. On the other hand, in short-distance transmission (e.g. in fiber jumper applications), linear polarization modes that are undesired for transmission in fibers need to be dissipated rapidly by means of linear polarization modes, or they will bring about difficulties in signal resolution. Therefore, it becomes a difficult issue for giving consideration to both the low loss in long-distance transmission and the effective attenuation of undesired linear polarization modes in short-distance transmission.

SUMMARY OF THE INVENTION

Aiming at the problems in the prior art, an object of the present invention is to provide a low-loss few-mode fiber, in which the transmission loss of optical signals of the linear polarization modes that are supported by the few-mode fiber is reduced, and the generation of error codes in communication systems and the relay cost are reduced; the loss of optical signals of the linear polarization modes that are not supported by the few-mode fiber are increased effectively, and undesired polarization mode optical signals can be filtered out quickly, facilitating the stability of transmission in fiber mode; the adjustment of differential group delay in the few-mode fiber can be achieved.

To achieve the above object, the present invention adopts the following technical solution: a low-loss few-mode fiber includes, from inside to outside, a core layer, a fluorine-doped quartz inner cladding, a fluorine-doped quartz second core layer, a fluorine-doped quartz depressed cladding and a fluorine-doped quartz outer cladding; the core layer is not doped with germanium element, the refractive index of the core layer is in gradient distribution, and the distribution is a power-exponent distribution; the maximum value of difference in relative refractive index between the core layer and the fluorine-doped quartz inner cladding is 0.3% to 0.9%; the relative refractive index difference of the fluorine-doped quartz inner cladding with respect to synthetic quartz is −0.3% to −0.5%; the difference in relative refractive index between the fluorine-doped quartz second core layer and the fluorine-doped quartz inner cladding is 0.05% to 0.2%; the difference in relative refractive index between the fluorine-doped quartz depressed cladding and the fluorine-doped quartz inner cladding is −0.1% to −0.5%; and the relative refractive index difference of the fluorine-doped quartz outer cladding with respect to synthetic quartz is −0.3% to −0.5%.

On the basis of the above technical solution, the radius of the core layer is 10-17.4 μm, the radius of the fluorine-doped quartz inner cladding is 10.5-21.4 μm, the radius of the fluorine-doped quartz second core layer is 11-22.4 μm, the radius of the fluorine-doped quartz depressed cladding is 20.5-40.0 μm, and the radius of the fluorine-doped quartz outer cladding is 40.0-100.0 μm.

On the basis of the above technical solution, the radius of the core layer is 15.2 μm, and the power exponent of distribution is 1.98; the maximum value of difference in relative refractive index between the core layer and the fluorine-doped quartz inner cladding is 0.40%; the radius of the fluorine-doped quartz inner cladding is 19.2 μm, and the refractive index difference of the fluorine-doped quartz inner cladding with respect to synthetic quartz is −0.30%; and the difference in relative refractive index between the fluorine-doped quartz second core layer and the fluorine-doped quartz inner cladding is 0.05%.

On the basis of the above technical solution, the power exponent of distribution of the core layer is 1.9-2.05.

On the basis of the above technical solution, the power exponent of distribution of the core layer is 1.92-1.94.

On the basis of the above technical solution, the few-mode fiber supports optical signals of linear polarization modes LP01, LP02, LP11 and LP21, and the range of working wavelength of the fiber is 1550 nm±25 nm.

On the basis of the above technical solution, the transmission loss of optical signals of the linear polarization modes supported by the few-mode fiber is less than 0.180 dB/km at 1550 nm wavelength.

On the basis of the above technical solution, the few-mode fiber does not support optical signals of other linear polarization modes than LP01,LP02,LP11 and LP21, and the cutoff wavelength of the optical signals in the other linear polarization modes is less than 1500 nm.

On the basis of the above technical solution, the loss per meter of optical signals in other linear polarization modes than LP01, LP02, LP11 and LP21 is greater than 20 dB.

On the basis of the above technical solution, the differential group delay of the few-mode fiber is less than 18 ps/km, and the fiber dispersion is less than 25 ps/(nm*km).

The present invention has the beneficial effects as follows:
1. in the few-mode fiber of the present invention, through the way of not doping germanium element in the core layer in combination with gradient doping of fluorine element, the transmission loss of optical signals of the linear polarization modes that are supported by the few-mode fiber is effectively reduced, and the generation of error codes in communication systems and the relay cost are reduced;
2. in the few-mode fiber of the present invention, by adding the fluorine-doped quartz second core layer to the fluorine-doped quartz inner cladding, the loss of optical signals of the linear polarization modes that are not supported by the few-mode fiber is effectively increased, and undesired polarization mode optical signals can be filtered out quickly, facilitating the stability of transmission in fiber mode;
3. in the few-mode fiber of the present invention, by adjusting the refractive index distribution of the core layer and adding the fluorine-doped quartz second core layer to the fluorine-doped quartz inner cladding, the adjustment of differential group delay in the few-mode fiber can be achieved.

Figure 1:
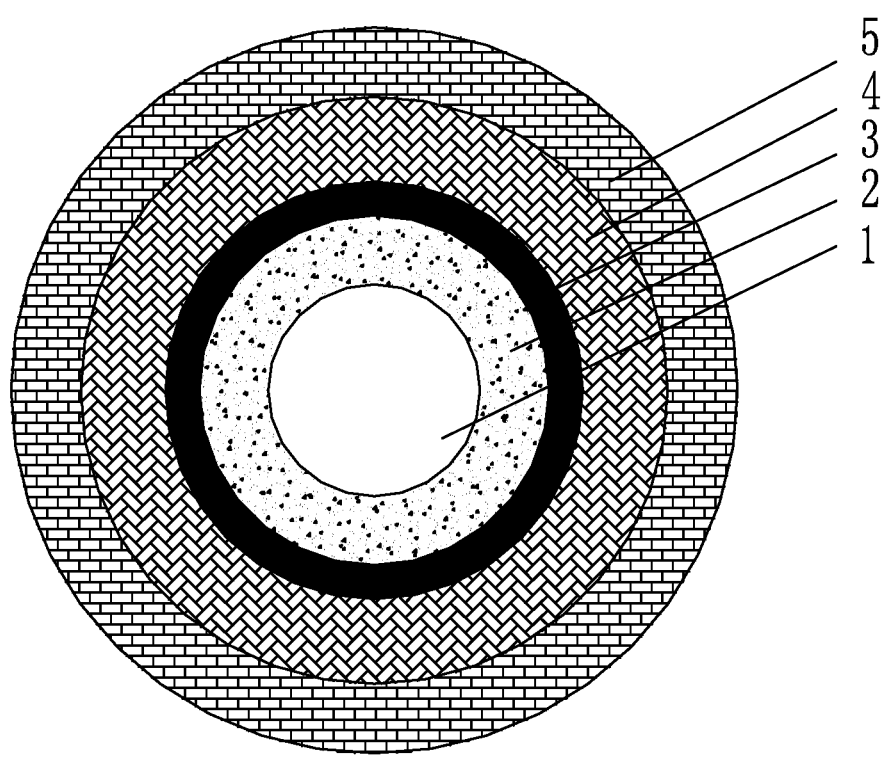
FIG. 1 is a schematic longitudinal sectional view of a low-loss few-mode fiber in an embodiment of the invention.

Reference numerals in the drawings:
1-core layer; 2-fluorine-doped quartz inner cladding; 3-fluorine-doped quartz second core layer; 4-fluorine-doped quartz depressed cladding; 5-fluorine-doped quartz outer cladding.

DETAILED DESCRIPTION OF THE INVENTION

In order to facilitate the understanding of the present invention, the terms used herein are first generally defined as follows:
core layer: a portion located in the center in the view of fiber cross section, acting as the primary light-guiding region of the fiber;
fluorine-doped quartz cladding: an annular region adjacent to the core layer in the view of fiber cross section;
inner cladding: a cladding region adjacent to the fiber core layer;
relative refractive index difference:

$$\Delta\% = \left[\frac{n_i^2 - n_0^2}{2 \times n_i^2}\right] \times 100\% \approx \frac{n_i - n_0}{n_0} \times 100\%$$

$n_i$ and $n_0$ refer respectively to the refractive indexes of a corresponding portion and its adjacent outside cladding at 1550 nm wavelength;

power exponent law refractive index distribution profile: a refractive index distribution pattern satisfying the following power exponent function, in which $n_1$ refers to the refractive index of the fiber axis; r refers to a distance from the fiber axis; a refers to a radius of the fiber core; α refers to a power exponent of distribution; Δ refers to a difference in relative refractive index of core/cladding;

$$n^2(r) = n_1^2\left[1 - 2 \times \Delta \times \left(\frac{r}{a}\right)^\alpha\right] \quad r < a$$

The present invention will be further described in detail with reference to the accompanying drawings and embodiments.

Referring to FIG. 1, an embodiment of the present invention provides a low-loss few-mode fiber, including, from inside to outside, a core layer 1, a fluorine-doped quartz inner cladding 2, a fluorine-doped quartz second core layer 3, a fluorine-doped quartz depressed cladding 4 and a fluorine-doped quartz outer cladding 5. The DGD (Differential Group Delay) of the few-mode fiber is less than 18 ps/km, and the fiber dispersion is less than 25 ps/(nm*km). The few-mode fiber supports optical signals of linear polarization modes LP01, LP02, LP11 and LP21 (See Fiber Optics, Liu Deming, Pages 29-32), and the range of working wavelength of the fiber is 1550 nm±25 nm.

Moreover, the transmission loss of optical signals of the linear polarization modes that are supported by the few-mode fiber is less than 0.180 dB/km at 1550 nm wavelength.

Consequently, the transmission loss of optical signals of the linear polarization modes that are supported by the few-mode fiber are reduced, and the generation of error codes in communication systems and the relay cost are reduced. Furthermore, the few-mode fiber does not support optical signals of other linear polarization modes than LP01, LP02, LP11 and LP21, and the cutoff wavelength of optical signals in the other linear polarization modes is less than 1500 nm. Moreover, the loss per meter of optical signals in other linear polarization modes than LP01, LP02, LP11 and LP21 is greater than 20 dB. Consequently, the loss of optical signals of the linear polarization modes that are not supported by the few-mode fiber is increased effectively, and undesired polarization mode optical signals can be filtered out quickly, facilitating the stability of transmission in fiber mode.

Figure 2:
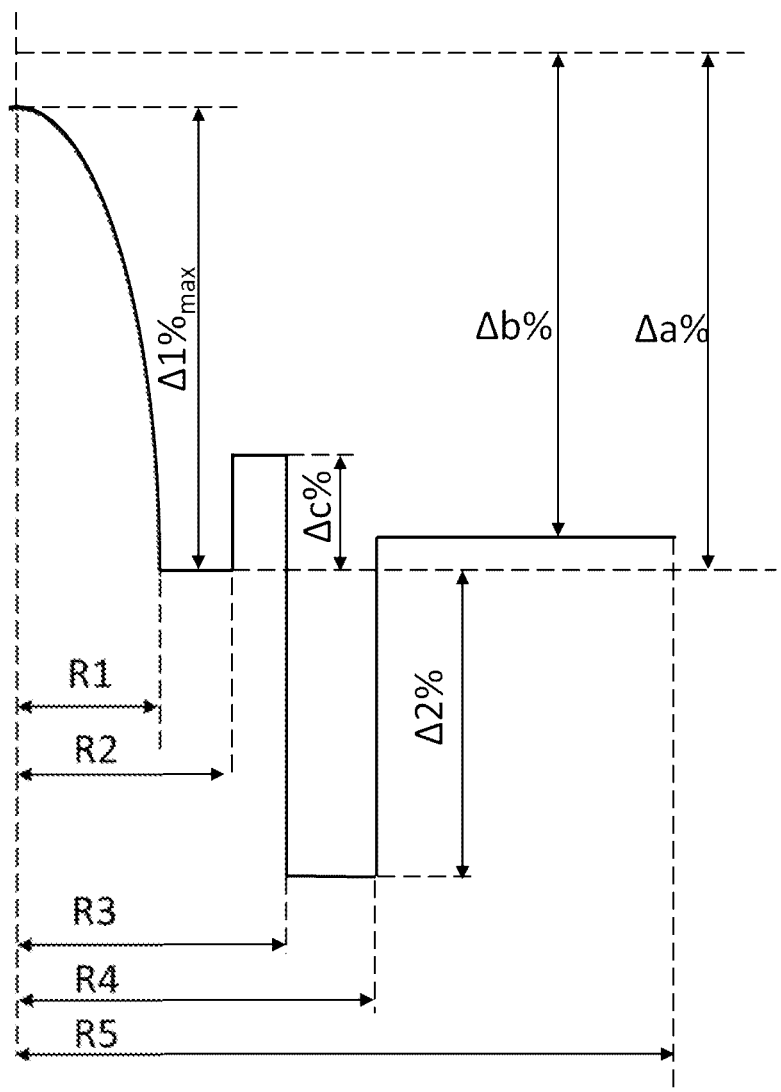
FIG. 2 is a schematic cross-sectional view of refractive index of the low-loss few-mode fiber in an embodiment of the invention.

Referring to FIG. 2, germanium element is not doped within the core layer 1, the refractive index of the core layer 1 is in gradient distribution, and the distribution is a power-exponent distribution; the power exponent of distribution a of the core layer 1 is 1.9-2.05, and preferably, the power exponent of distribution a of the core layer 1 is 1.92-1.94. The maximum value of difference in relative refractive index ($\Delta 1\%_{max}$) between the core layer 1 and the fluorine-doped quartz inner cladding 2 is 0.3% to 0.9%, and the radius R1 of the core layer 1 is 10-17.4 μm. Preferably, the radius R1 of the core layer 1 is 15.2 μm, and the power exponent of distribution α is 1.98; the maximum value of difference in relative refractive index ($\Delta 1\%_{max}$) between the core layer 1 and the fluorine-doped quartz inner cladding 2 is 0.40%;

the relative refractive index difference (Δa %) of the fluorine-doped quartz inner cladding 2 with respect to synthetic quartz is −0.3% to −0.5%; the radius R2 of the fluorine-doped quartz inner cladding 2 is 10.5-21.4 μm; preferably, the radius R2 of the fluorine-doped quartz inner cladding 2 is 19.2 μm, and the refractive index difference (Δa %) of the fluorine-doped quartz inner cladding 2 with respect to synthetic quartz is −0.30%.

The difference in relative refractive index (Δc %) between the fluorine-doped quartz second core layer 3 and the fluorine-doped quartz inner cladding 2 is 0.05% to 0.2%; the radius R3 of the fluorine-doped quartz second core layer 3 is 11-22.4 μm.

Preferably, the difference in relative refractive index (Δc %) between the fluorine-doped quartz second core layer 3 and the fluorine-doped quartz inner cladding 2 is 0.05%.

The difference in relative refractive index (Δ2%) between the fluorine-doped quartz depressed cladding 4 and the fluorine-doped quartz inner cladding 2 is −0.1% to −0.5%; the radius R4 of the fluorine-doped quartz depressed cladding 4 is 20.5-40.0 μm.

The relative refractive index difference (Δb %) of the fluorine-doped quartz outer cladding 5 with respect to synthetic quartz is −0.3% to −0.5%. The radius R5 of the fluorine-doped quartz outer cladding 5 is 40.0-100.0 μm.

Several typical embodiments and detected data are as follows:

The present invention is not limited to the embodiments mentioned above. It will be obvious to a person of ordinary skill in the art that various modifications and alternatives can be made without departing from the principles of the invention, and these modifications and alternatives are intended to fall into the scope of the invention.

What is not described in detail in this description belongs to the prior art known to a person skilled in the art.

The invention claimed is:

1. A low-loss few-mode fiber, characterized in that: the few-mode fiber includes, from inside to outside, a core layer (1), a fluorine-doped quartz inner cladding (2), a fluorine-doped quartz second core layer (3), a fluorine-doped quartz depressed cladding (4) and a fluorine-doped quartz outer cladding (5);

the core layer (1) is not doped with germanium element, the refractive index of the core layer (1) is in gradient distribution, and the distribution is a power-exponent distribution;

the maximum value of difference in relative refractive index between the core layer (1) and the fluorine-doped quartz inner cladding (2) is 0.3% to 0.9%;

the relative refractive index difference of the fluorine-doped quartz inner cladding (2) with respect to synthetic quartz is −0.3% to −0.5%;

| Embodiment No. | 1 | 2 | 3 | 4 | 5 | 6 | 7 |
|---|---|---|---|---|---|---|---|
| core layer power exponent coefficient α | 1.7 | 1.9 | 1.92 | 1.94 | 1.98 | 2.05 | 2.3 |
| $\Delta1_{max}$ (%) | 0.9 | 0.8 | 0.5 | 0.5 | 0.5 | 0.4 | 0.3 |
| Δ2 (%) | −0.1 | −0.2 | −0.5 | −0.5 | −0.5 | −0.6 | −0.7 |
| Δa (%) | −0.3 | −0.5 | −0.3 | −0.3 | −0.3 | −0.3 | −0.3 |
| Δb (%) | −0.3 | −0.1 | −0.3 | −0.3 | −0.3 | −0.3 | −0.3 |
| Δc (%) | 0.2 | 0.1 | 0.05 | 0.05 | 0.05 | 0.05 | 0.05 |
| R1 (μm) | 10 | 10.7 | 13.6 | 10.2 | 13.6 | 15.2 | 17.4 |
| R2 (μm) | 10.5 | 11.2 | 15.1 | 13.2 | 16.6 | 19.2 | 21.4 |
| R3 (μm) | 11 | 12.2 | 17.1 | 15.2 | 18.6 | 20.2 | 22.4 |
| R4 (μm) | 20.5 | 19.2 | 23.1 | 21.2 | 24.6 | 34.2 | 40 |
| R5 (μm) | 62.5 | 62.5 | 62.5 | 62.5 | 62.5 | 40 | 62.5 |
| modes supported | LP01/ LP02/ LP11/ LP21 | LP01/ LP02/ LP11/ LP21 | LP01/ LP02/ LP11/ LP21 | LP01/ LP11 | LP01/ LP02/ LP11/ LP21 | LP01/ LP02/ LP11/ LP21 | LP01/ LP02/ LP11/ LP21 |
| differential group delay DGD | 17.6 | 16.1 | 9.1 | 9.2 | 8.9 | 8.9 | 15.2 |
| 1550 nm dispersion coefficient (LP01) | 20.2 | 19.8 | 19.4 | 19.2 | 19.1 | 18.1 | 19.7 |
| 1550 nm dispersion coefficient (LP02) | 20.8 | 19.9 | 19.1 | — | 19.3 | 18.8 | 19.3 |
| 1550 nm dispersion coefficient (LP11) | 20.1 | 19.6 | 19.5 | 19.5 | 18.9 | 18.1 | 19.1 |
| 1550 nm dispersion coefficient (LP21) | 19.9 | 19.2 | 19 | — | 18.8 | 17.7 | 18.9 |
| LP01 attenuation coefficient (dB/km) | 0.179 | 0.176 | 0.175 | 0.172 | 0.169 | 0.166 | 0.171 |
| LP02 attenuation coefficient (dB/km) | 0.175 | 0.178 | 0.178 | 26 | 0.171 | 0.171 | 0.178 |
| LP11 attenuation coefficient (dB/km) | 0.174 | 0.179 | 0.174 | 0.172 | 0.177 | 0.173 | 0.174 |
| LP21 attenuation coefficient (dB/km) | 0.177 | 0.18 | 0.177 | 43 | 0.177 | 0.174 | 0.179 |

It can be seen from the tests shown in the above table that as compared with the conventional few-mode fiber of the same type, the low-loss few-mode fiber provided by the present invention has greatly reduced the attenuation coefficient (the loss of about 0.2 dB/km for the conventional few-mode fibers), and the fiber exhibits relatively good performances in impairing the linear polarization modes which it does not support.

the difference in relative refractive index between the fluorine-doped quartz second core layer (3) and the fluorine-doped quartz inner cladding (2) is 0.05% to 0.2%;

the difference in relative refractive index between the fluorine-doped quartz depressed cladding (4) and the fluorine-doped quartz inner cladding (2) is −0.1% to −0.5%;

the relative refractive index difference of the fluorine-doped quartz outer cladding (5) with respect to the synthetic quartz is −0.3% to −0.5%.

2. The low-loss few-mode fiber of claim 1, characterized in that:
the radius of the core layer (1) is 10-17.4 μm,
the radius of the fluorine-doped quartz inner cladding (2) is 10.5-21.4 μm,
the radius of the fluorine-doped quartz second core layer (3) is 11-22.4 μm,
the radius of the fluorine-doped quartz depressed cladding (4) is 20.5-40.0 μm,
and the radius of the fluorine-doped quartz outer cladding (5) is 40.0-100.0 μm.

3. The low-loss few-mode fiber of claim 1, characterized in that:
the radius of the core layer (1) is 15.2 μm, and the power exponent of distribution is 1.98;
the maximum value of difference in relative refractive index between the core layer (1) and the fluorine-doped quartz inner cladding (2) is 0.40%;
the radius of the fluorine-doped quartz inner cladding (2) is 19.2 μm, and the refractive index difference of the fluorine-doped quartz inner cladding (2) with respect to the synthetic quartz is −0.30%;
and the difference in relative refractive index between the fluorine-doped quartz second core layer (3) and the fluorine-doped quartz inner cladding (2) is 0.05%.

4. The low-loss few-mode fiber of claim 1, characterized in that: the power exponent of distribution of the core layer (1) is 1.9-2.05.

5. The low-loss few-mode fiber of claim 1, characterized in that: the power exponent of distribution of the core layer (1) is 1.92-1.94.

6. The low-loss few-mode fiber of claim 1, characterized in that: the few-mode fiber supports optical signals of linear polarization modes LP01, LP02, LP11 and LP21, and the range of working wavelength of the fiber is 1550 nm±25 nm.

7. The low-loss few-mode fiber of claim 6, characterized in that: the transmission loss of optical signals of the linear polarization modes that are supported by the few-mode fiber is less than 0.180 dB/km at 1550 nm wavelength.

8. The low-loss few-mode fiber of claim 1, characterized in that: the few-mode fiber does not support optical signals of other linear polarization modes than LP01, LP02, LP11 and LP21, and the cutoff wavelength of the optical signals in the other linear polarization modes is less than 1500 nm.

9. The low-loss few-mode fiber of claim 8, characterized in that: the loss per meter of the optical signals in the other linear polarization modes than LP01, LP02, LP11 and LP21 is greater than 20 dB.

10. The low-loss few-mode fiber of claims 1, characterized in that: the differential group delay of the few-mode fiber is less than 18 ps/km, and the fiber dispersion is less than 25 ps/(nm*km).

11. The low-loss few-mode fiber of claim 2, characterized in that: the differential group delay of the few-mode fiber is less than 18 ps/km, and the fiber dispersion is less than 25 ps/(nm*km).

12. The low-loss few-mode fiber of claim 3, characterized in that: the differential group delay of the few-mode fiber is less than 18 ps/km, and the fiber dispersion is less than 25 ps/(nm*km).

13. The low-loss few-mode fiber of claim 4, characterized in that: the differential group delay of the few-mode fiber is less than 18 ps/km, and the fiber dispersion is less than 25 ps/(nm*km).

14. The low-loss few-mode fiber of claim 5, characterized in that: the differential group delay of the few-mode fiber is less than 18 ps/km, and the fiber dispersion is less than 25 ps/(nm*km).

15. The low-loss few-mode fiber of claim 6, characterized in that: the differential group delay of the few-mode fiber is less than 18 ps/km, and the fiber dispersion is less than 25 ps/(nm*km).

16. The low-loss few-mode fiber of claim 7, characterized in that: the differential group delay of the few-mode fiber is less than 18 ps/km, and the fiber dispersion is less than 25 ps/(nm*km).

17. The low-loss few-mode fiber of claim 8, characterized in that: the differential group delay of the few-mode fiber is less than 18 ps/km, and the fiber dispersion is less than 25 ps/(nm*km).

18. The low-loss few-mode fiber of claim 9, characterized in that: the differential group delay of the few-mode fiber is less than 18 ps/km, and the fiber dispersion is less than 25 ps/(nm*km).

* * * * *